United States Patent
Zolnai-Lucas et al.

(10) Patent No.: US 12,393,851 B1
(45) Date of Patent: Aug. 19, 2025

(54) METHOD AND SYSTEM FOR GENERATING AT LEAST ONE PERSPECTIVE OF KNOWLEDGE GRAPH

(71) Applicant: QUANTEXA LTD., London (GB)

(72) Inventors: Aaron Zolnai-Lucas, London (GB); Milan Cvjetkovic, London (GB)

(73) Assignee: QUANTEXA LTD., London (GB)

(*) Notice: Subject to any disclaimer, the term of this patent is extended or adjusted under 35 U.S.C. 154(b) by 0 days.

(21) Appl. No.: 18/781,012

(22) Filed: Jul. 23, 2024

(51) Int. Cl.
*G06N 5/022* (2023.01)
*G06N 5/02* (2023.01)
G06F 16/2453 (2019.01)
G06F 16/901 (2019.01)

(52) U.S. Cl.
CPC .......... *G06N 5/022* (2013.01); *G06N 5/02* (2013.01); *G06F 16/2453* (2019.01); *G06F 16/9024* (2019.01)

(58) Field of Classification Search
CPC ...... G06N 5/022; G06N 5/02; G06F 16/2453; G06F 16/9024
See application file for complete search history.

(56) References Cited

U.S. PATENT DOCUMENTS

| | | | |
|---|---|---|---|
| 2014/0244657 A1* | 8/2014 | Mizell | G06F 16/2228 707/743 |
| 2016/0335371 A1 | 11/2016 | Rao | |
| 2018/0137667 A1 | 5/2018 | Kindelsberger et al. | |
| 2019/0303406 A1 | 10/2019 | Gu et al. | |

(Continued)

FOREIGN PATENT DOCUMENTS

EP 3640864 A1 4/2020

OTHER PUBLICATIONS https://web.archive.org/web/20240317020409/https://neo4j.com/docs/cypher-manual/current/planning-and-tuning/execution-plans/#expand, Mar. 17, 2024, (Neo4j). (Year: 2024).*

(Continued)

*Primary Examiner* — Kamran Afshar
*Assistant Examiner* — Steven Phung
(74) *Attorney, Agent, or Firm* — Ziegler IP Law Group, LLC

(57) ABSTRACT

There is disclosed a method for generating perspective(s) (300) of a knowledge graph (302). The method comprises receiving the knowledge graph from a database, wherein the knowledge graph comprises vertices at least partially connected together by edges; generating a property graph (202) of the knowledge graph, wherein the property graph comprises vertices (204A-C) at least partially connected together by edges (206A-D); creating metagraph transformation(s) to be executed on the property graph for generating perspective(s) of knowledge graph, wherein each of metagraph transformation(s) is lazily evaluated on property graph; adjusting metagraph transformation(s) based on lazy evaluation of the metagraph transformation(s) on the property graph; executing metagraph transformation(s) on the property graph, based on execution of matrix-linear algebra operations parallelly for each of metagraph transformation(s), on device(s); and generating multigraph(s) for depicting perspective(s) of the knowledge graph based on a corresponding transformed property graph (200) generated from execution of each of metagraph transformation(s) on property graph.

16 Claims, 3 Drawing Sheets

(56) References Cited

U.S. PATENT DOCUMENTS

| | | | |
|---|---|---|---|
| 2019/0340303 A1 | 11/2019 | Bessiere et al. | |
| 2020/0265090 A1* | 8/2020 | Hilloulin | G06F 16/9024 |
| 2021/0263898 A1* | 8/2021 | Lei | G06F 16/9024 |
| 2021/0279950 A1* | 9/2021 | Phalak | G06T 7/55 |
| 2022/0343145 A1* | 10/2022 | Xue | G06F 17/16 |
| 2023/0004583 A1* | 1/2023 | Marmanis | G06F 16/2282 |
| 2023/0350931 A1* | 11/2023 | Lewis | G06F 16/338 |

OTHER PUBLICATIONS https://web.archive.org/web/20240317014850/https://neo4j.com/docs/cypher-manual/current/planning-and-tuning/query-tuning/, Mar. 17, 2024, (Neo4j2). (Year: 2024).* https://web.archive.org/web/20240414171001/https://neo4j.com/docs/cypher-manual/current/queries/basic/, Apr. 14, 2024, (Neo4j3). (Year: 2024).*

Quotients of Complete Multipartite Graphs, Cho Wei Sit, Pacific Journal of Mathematics vol. 63, No. 2, 1976. (Year: 1976).*

Chernenkiy et al., "Using the metagraph approach for addressing RDF knowledge representation limitations" Research Gate, Conference Paper, Sep. 2017,https://www.researchgate.net/publication/320971191, DOI: 10.1109/ITECHA.2017.8101909, 7 pages.

Swedish Intellectual Property Office, Notice, Application No. 2430383-6, mailed Dec. 19, 2024, 11 pages.

* cited by examiner

METHOD AND SYSTEM FOR GENERATING AT LEAST ONE PERSPECTIVE OF KNOWLEDGE GRAPH

TECHNICAL FIELD

The present disclosure relates to methods for generating at least one perspective of knowledge graphs. Moreover, the present disclosure relates to systems for implementing the aforesaid methods for generating at least one perspective of knowledge graphs. Furthermore, the present disclosure relates to software products recorded on machine-readable data carriers, wherein the software products are executable on computing hardware for implementing aforesaid methods.

BACKGROUND

In recent times, graph databases and analytics tools have become essential for managing and analyzing complex datasets, wherein the complex datasets may potentially include heterogeneous graph data; the complex datasets describe or represent, for example, complex real physical systems. When using the tools, there are generated heterogeneous graphs containing multiple types of nodes (also referred to as "vertices") and edges; such heterogeneous graphs are suitable for representing real-world systems such as social networks, biological networks, and knowledge graphs. Several graph database providers and analytics packages have recently emerged to address these needs of managing and analyzing complex datasets, wherein each of the analytics packages has its associated strengths and limitations.

Existing known providers of graph databases and analytics tools, such as Neo4j and TigerGraph, are prominent graph database providers that utilize storage of heterogeneous graph data using a property graph model. However, such existing solutions of Neo4j and TigerGraph are not publicly known to leverage linear algebra for achieving computational speedups. Moreover, Neo4j and TigerGraph do not support lazy evaluation or provide visual feedback on the property graph during projections, which potentially limit their scalability and usability for large-scale graph analytics. Moreover, the existing solution like NetworkX offers comprehensive tools for graph analysis in Python. However, NetworkX is not optimized for heterogeneous graphs or large-scale graph processing, which limits its applicability in enterprise environments dealing with extensive and complex graph datasets.

Furthermore, an existing solution of Spark GraphX is designed for large-scale graph processing, which supports a property graph model and provides robust tools for graph transformations and analytics. However, despite its scalability and integration with a Spark platform, the Spark GraphX does not support projections or quotients that modify the graph structure. Additionally, the Spark GraphX lacks visual feedback capabilities, making it challenging for users to intuitively understand and manipulate graph transformations. Furthermore, an existing solution of cuGraph is a GPU-accelerated graph analytics library which leverages the power of GPUs to perform graph linear algebra operations in parallel, significantly speeding up computations. However, the cuGraph does not offer expressive projections or quotients with visual feedback which hinders users from fully exploiting the potential of GPU acceleration for complex graph transformations.

Therefore, in light of the foregoing discussion, there exists a need to overcome the aforementioned drawbacks encountered with known databases and tools.

SUMMARY

The aim of the present disclosure is to provide a method for generating at least one perspective of a knowledge graph to reduce a complexity and a run-time of generating the at least one perspective. The aim of the present disclosure is achieved by a method and a system for generating at least one perspective as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
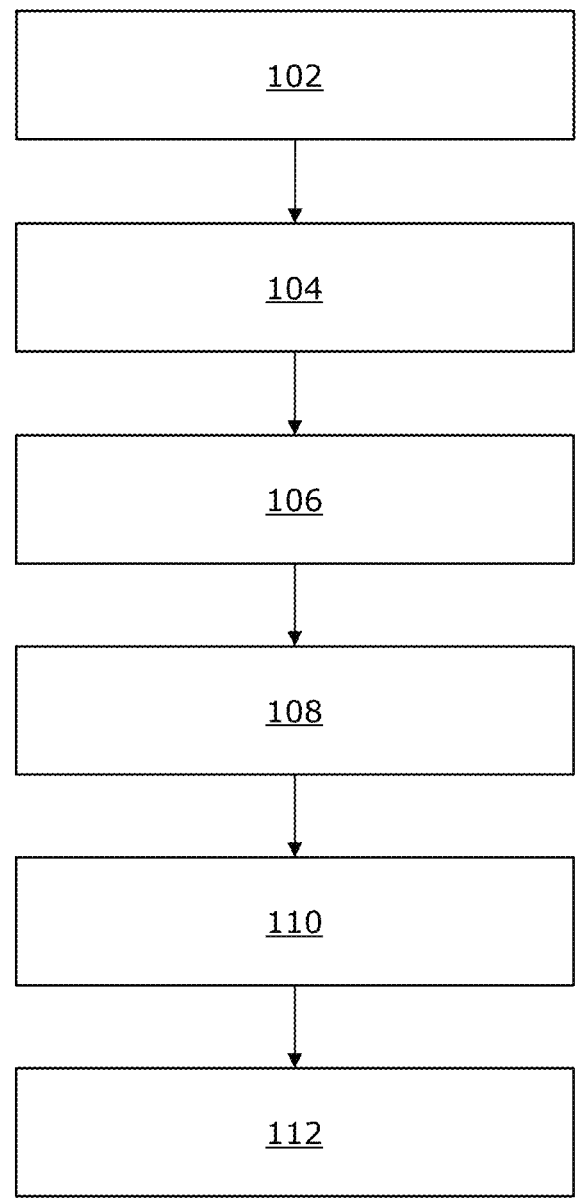
FIG. 1 is a flowchart depicting steps of a method for generating at least one perspective of a knowledge graph, according to an embodiment of the present disclosure.

The following detailed description illustrates embodiments of the present disclosure and ways in which they may be implemented. Although some modes of carrying out the present disclosure have been disclosed, those skilled in the art would recognize that other embodiments for carrying out or practising the present disclosure are also possible.

In a first aspect, the present disclosure provides a method for generating at least one perspective of a knowledge graph, the method comprising:
  receiving the knowledge graph from a database, wherein the knowledge graph comprises a plurality of vertices at least partially connected together by a plurality of edges;
  generating a property graph of the knowledge graph, wherein the property graph comprises a set of vertices at least partially connected together by a set of edges;
  creating at least one metagraph transformation to be executed on the property graph for generating the at least one perspective of the knowledge graph, wherein each of the at least one metagraph transformation is lazily evaluated on the property graph;

adjusting the at least one metagraph transformation based on the lazy evaluation of the at least one metagraph transformation on the property graph;

executing at least one metagraph transformation on the property graph, based on execution of a plurality of matrix-linear algebra operations parallelly for each of the at least one metagraph transformation, on at least one device; and generating at least one multigraph for depicting the at least one perspective of the knowledge graph based on corresponding transformed property graph generated from the execution of each of the at least one metagraph transformation on the property graph.

The present disclosure provides an aforementioned method that is able to significantly reduce a complexity and a run-time of generating the at least one perspective of the knowledge graph. Moreover, the method provides a less cumbersome way to execute the at least one metagraph transformation on the property graph at a large scale. Furthermore, each of the at least one metagraph transformation being lazily evaluated significantly reduces a computational burden. Furthermore, the at least one perspective that is generated is space efficient.

In a second aspect, the present disclosure provides a system for generating at least one perspective of a knowledge graph, the system comprising:

at least one processor configured to:
  receive the knowledge graph from a database communicably coupled to the at least one processor, wherein the knowledge graph comprises a plurality of vertices at least partially connected together by a plurality of edges;

generate a property graph of the knowledge graph, wherein the property graph comprises a set of vertices connected by a set of edges;

create at least one metagraph transformation to be executed on the property graph of the knowledge graph to generate the at least one perspective of the knowledge graph, wherein each of the at least one metagraph transformation is lazily evaluated on the property graph;

adjust the at least one metagraph transformation based on the lazy evaluation of the at least one metagraph transformation on the property graph;

execute the at least one metagraph transformation on the property graph, based on execution of a plurality of matrix-linear algebra operations parallelly for each of the at least one metagraph transformation, on at least one device communicably coupled to the at least one processor; and generate at least one multigraph to depict the at least one perspective of the knowledge graph based on corresponding transformed property graph generated from the execution of each of the at least one metagraph transformation on the property graph.

The present disclosure provides an aforementioned system that is able to significantly reduce a complexity and a run-time of generating the at least one perspective of the knowledge graph. Moreover, the system provides a less cumbersome way to execute the at least one metagraph transformation on the property graph at a large scale. Furthermore, each of the at least one metagraph transformation being lazily evaluated significantly reduces a computational burden on the at least one processor. Furthermore, the at least one perspective that is generated is space efficient.

Throughout the present disclosure, the term "knowledge graph" refers to a structured representation of knowledge using graph-based techniques to model relationships between entities (i.e., real-world objects related to which the information is depicted in the knowledge graph) in a way that is both human-readable and machine-interpretable. Notably, the knowledge graph is used to integrate, manage, and query complex and interconnected information. Throughout the present disclosure, the term "perspective" refers to a specific view or subset of the knowledge graph that is generated for highlighting certain aspects, entities or relationships relevant to a particular context or query. It will be appreciated that the "at least one perspective" refers to "single perspective" in some implementations, and "a plurality of perspectives" in other implementations. Notably, generating the at least one perspective of the knowledge graph enables to focus on relevant data, perform targeted analysis, and simplify the interaction with the knowledge graph. Throughout the present disclosure, the term "database" refers to a structured collection of data organized and stored in a way that it may be easily accessed, retrieved, managed, and updated. The database is designed to handle large amounts of data and provide mechanisms for querying, updating, and manipulating that data. Optionally, the knowledge graph is received from the database based on a user input. Throughout the present disclosure, the term "vertices" refers to nodes in the knowledge graph that represent the entities within the knowledge graph. Notably, each vertex amongst the plurality of vertices encapsulate a wide range of information about a corresponding entity represented by it. For example, the plurality of vertices represent the entities such as people, places, objects, and the like. Throughout the present disclosure, the term "edges" refer to lines in the knowledge graph that represent the relationships between the entities within the knowledge graph. Notably, the plurality of vertices being at least partially connected together by the plurality of edges implies that any two given vertices amongst the plurality of vertices which have a relationship therebetween are connected by a given edge amongst the plurality of edges.

Optionally, a number of the plurality of vertices in the knowledge graph is at least 1 billion vertices. In this regard, the number of vertices in the knowledge graph being at least 1 billion vertices implies that the knowledge graph is able to store data of massive scale and high complexity. A technical effect of the number of vertices in the knowledge graph being at least 1 billion vertices is that highly complex data related to large-scale systems is effectively and efficiently represented in the knowledge graph.

Throughout the present disclosure, the term "property graph" refers to a graph data model that extends a basic graph structure of the knowledge graph by allowing the plurality of vertices and the plurality of edges to have properties in form of key-value pairs. Notably, the property is significantly flexible and expressive which makes the property graph suitable for performing complex transformations without making any changes to the knowledge graph. The property graph of the knowledge graph is generated by transforming the data representation in the knowledge graph from one format to another format while preserving the semantic information and relationships between the plurality of vertices in the knowledge graph. It will be appreciated that the set of vertices are generated from the plurality of vertices while generating the property graph of the knowledge graph. Similarly, the set of edges are generated from the plurality of edges while generating the property graph of the knowledge graph. Notably, the set of vertices being at least partially connected together by the set of edges implies that any two given vertices amongst the set of vertices which have a relationship therebetween are connected by a given edge amongst the set of edges.

Optionally, the plurality of vertices and edges in the knowledge graph, and the set of vertices and edges in the property graph of the knowledge graph are represented as a list of adjacency matrices, and wherein the list of adjacency matrices is indexed by a triplet of a source, a relationship, and a destination vertex or edge type. In this regard, the term "adjacency matrices" refers to square matrices that indicate whether pairs of vertices in a given graph are adjacent or not. Notably, the plurality of vertices and edges in the knowledge graph being represented as the list of the adjacency matrices implies that the list of adjacency matrices contains information about which pairs of vertices in the knowledge graph are adjacent. Similarly, the set of vertices and edges in the property graph being represented as the list of the adjacency matrices implies that the list of adjacency matrices contains information about which pairs of vertices in the property graph are adjacent. Throughout the present disclosure, the term "source" refers to a starting point of an edge of either the knowledge graph or the property graph. Throughout the present disclosure, the term "relationship" refers to a type of relationship between a pair of vertices in either the knowledge graph or the property graph. Throughout the present disclosure, the term "destination vertex" refers to an endpoint of the edge of either the knowledge graph or the property graph. Notably, the list of matrices being indexed by the triplet of the source, the relationship, and the destination vertex or edge type enables to effectively organize the list of adjacency matrices. A technical effect is that the pairs of vertices that are adjacent are clearly defined in the knowledge graph and the property graph.

Throughout the present disclosure, the term "metagraph transformation" refers to using a higher-level abstraction to perform a complex transformation on the data of the property graph without directly modifying the property graph. It will be appreciated that the "at least one metagraph transformation" refers to "single metagraph transformation" in some implementations, and "a plurality of metagraph transformations" in other implementations. In other words, the at least one metagraph transformation refers to the abstract representation of at least one transformation that may be executed on the property graph. Notably, each of the at least one metagraph transformation being lazily evaluated on the property graph implies that the at least one metagraph transformation is visualized for evaluation without executing the at least one metagraph transformation. Beneficially, each of the at least one metagraph transformation being lazily evaluated significantly reduces a burden on computational resources.

Notably, adjusting the at least one metagraph transformation relates to modifying the at least one metagraph transformation in order to optimize results of executing the at least one metagraph transformation on the property graph. It will be appreciated that adjusting the at least one metagraph transformation based on the lazy evaluation of the at least one metagraph transformation enables to use the evaluation of the at least one metagraph transformation determined from the lazy evaluation for determining what modifications to be in the at least one metagraph transformation.

Notably, executing each of the at least one metagraph transformation requires the plurality of matrix-linear algebra operations, as the set of vertices and edges are represented as the list of the adjacency matrices. Throughout the present disclosure, the term "matrix-linear algebra operation" refers to a fundamental mathematical operation (for example, addition, multiplication, and the like) performed on the list matrices in the property graph. It will be appreciated that the plurality of matrix-linear algebra operations being executed in parallel enables to significantly increase a number of the at least one metagraph transformation that may be executed on the property graph. Moreover, the plurality of matrix-linear algebra operations are executed in parallel on the at least one device. In other words, each of the plurality of matrix-linear algebra operations are executed in parallel on "single device" in some implementations, and "a plurality of devices" in other implementations. Throughout the present disclosure, the term "device" refers to a computing device that has processing capabilities for executing the plurality of matrix-linear algebra operations.

Optionally, the plurality of matrix-linear algebra operations comprises at least one of: a multipartite projection, an edge aggregation, a multipartite quotient, a vertex and edge type removal. In this regard, the term "multipartite projection" refers to a type of a matrix-linear algebra operation in which paths in the property graph that match a sequence of nodes and relationship types are converted into a new edge in the corresponding transformed property graph. Optionally, each edge traversed in the path contributes to the new edge based on a user-specified Semiring function (also known as augmentation). Throughout the present disclosure, the term "edge aggregation" refers to a type of the matrix-linear algebra operation in which multiple edges between a given pair of vertices in the property graph are simplified into a single new edge between the given pair of vertices in corresponding transformed property graph. Optionally, weight of the single new edge is determined using a user-specified Monoid function. Throughout the present disclosure, the term "multipartite quotient" refers to a type of the matrix-linear algebra operation in which those vertices amongst the set of vertices in the property graph that match a pattern are contracted into a single new vertex in the corresponding transformed property graph. Throughout the present disclosure, the term "vertex and edge type removal" refers to a type of the matrix-linear algebra operation in which types of the vertices and edges that are to appear in the at least one perspective are selected. A technical effect is that the plurality of matrix-linear algebra operations comprises a variety of different matrix-linear algebra operations which significantly enhances a complexity of the at least one metagraph transformation that may be executed on the property graph.

Optionally, the multipartite quotient comprises a series of the multipartite projections. In this regard, the multipartite quotient comprising the series of the multipartite projections implies that the multipartite projections are iteratively performed on the property graph until effects of performing the multipartite quotient on the property graph are achieved in the corresponding transformed property graph. A technical effect is that the effectiveness of performing the multipartite quotient is improved by the multipartite quotient comprising the se series of the multipartite projections.

Optionally, the plurality of matrix-linear algebra operations are parallelly executed for each of the at least one metagraph transformation, on the at least one device, using a spark processing arrangement. In this regard, the term "spark processing arrangement" refers to a type of processing arrangement that enables the plurality of matrix-linear algebra operations to be executed in parallel, on the at least one device. A technical effect is that highly complex matrix-linear algebra operations are executed in parallel at a massive scale. Beneficially, using the spark processing arrangement enables to execute the plurality of matrix-linear algebra operations on the property graph of the knowledge in which the number of the plurality of vertices is at least one 1 billion.

Optionally, the each of the plurality of matrix-linear algebra operations for each of the at least one metagraph transformation is executed using a Graph BLAS library for performing matrix calculations associated with each of the plurality of matrix-linear algebra operations. In this regard, the Graph BLAS library is well-known in the art for sparse matrices representing graph adjacencies. Throughout the present disclosure, the term "matrix calculations" refers to mathematical calculations of matrices that are related to the plurality of matrix-linear algebra operations to be performed. A technical effect is that the matrix calculations associated with each of the plurality of matrix-linear algebra operations are accurately and effective performed using the Graph BLAS library, which enhances the accuracy of performing each of the plurality of matrix-linear algebra operations.

Optionally, the method further comprises storing a result of the execution of each of the at least one metagraph transformation on the property graph in a data repository. In this regard, the result of the execution of each of the at least one metagraph transformation on the property graph are in the form of the corresponding transformed property graph generated from the execution of each of the at least one metagraph transformation on the property graph. Throughout the present disclosure, the term "data repository" refers to a centralized place to store and manage data. A technical effect of storing the result of the execution of each of the at least one metagraph transformation on the property graph in the data repository is that data related to the result of the execution of each of the at least one metagraph transformation on the property graph may be used for further analysis and gaining insights on the execution of each of the at least one metagraph transformation on the property graph.

Optionally, the method further comprises:
de-selecting one or more vertices amongst the set of vertices and one or more edges amongst the set of edges in the property graph that remain unchanged in the corresponding transformed property graph and depicting the one or more vertices and the one or more edges to be faded out in the at least one multigraph; and
adding new edges to the corresponding transformed property graph represented in form of dashed lines.

In this regard, the set of vertices and one or more edges amongst the set of edges in the property graph that remain unchanged in the corresponding transformed property graph are irrelevant and not required to be shown in the at least one perspective of the knowledge graph. Notably, de-selecting the one or more vertices and the one or more edges enables to identify which vertices and edges in the property graph are irrelevant for the at least one perspective of the knowledge graph. Subsequently, depicting the one or more vertices and the one or more edges to be faded out in the at least one multigraph enables to depict the irrelevancy of the one or more vertices and the one or more edges in the at least one perspective of the knowledge graph. Notably, adding new edges to the corresponding transformed property graph represented in form of dashed lines enables to highlight the effects of executing the at least one metagraph transformation on the property graph, in the corresponding transformed property graph. A technical effect is that the corresponding transformed property graph effectively highlights those elements in the corresponding transformed property graph that are relevant to the at least one perspective, while fading out those elements in the corresponding transformed property graph that are irrelevant to the at least one perspective.

Throughout the present disclosure, the term "corresponding transformed property graph" refers to an updated property graph that generated from executing a given metagraph transformation from amongst the at least one metagraph transformation on the property graph. Notably, the corresponding transformed property graph is generated separately for each of the at least one metagraph transformation. It will be appreciated that the transformations made in the corresponding transformed property graph for each of the at least one metagraph transformation are indicative of the at least one perspective of the knowledge graph to be generated Throughout the present disclosure, the term "multigraph" refers to that graph having multiple edges between a given pair of vertices, which allows the given pair of vertices to have multiple relationships. It will be appreciated that the "at least one multigraph" refers to "single multigraph" in some implementations, and "a plurality of multigraphs" in other implementations. Optionally, the at least one multigraph is at least one directed multigraph. Moreover, a number of the at least one multigraph is equal to a number of the at least one metagraph transformation. Notably, generating the at least one multigraph based on the corresponding transformed property graph generated from the execution of each of the at least one metagraph transformation on the property graph implies that the transformations in the corresponding transformed property graph that are indicative of the at least one perspective of the knowledge graph are used in generating the at least one multigraph for depicting the at least one perspective of the knowledge graph.

Optionally, the method further comprising:
creating at least one another metagraph transformation to be executed on the corresponding transformed property graph generated from the execution of the at least one metagraph transformation on the property graph, for generating at least one another perspective of the knowledge graph, wherein each of the at least one another metagraph transformation is lazily evaluated on the corresponding transformed property graph;
adjusting the at least one another metagraph transformation based on the lazy evaluation of the at least one another metagraph transformation on the corresponding transformed property graph;
executing the at least one another metagraph transformation on the corresponding transformed property graph, based on the execution of the plurality of matrix-linear algebra operations parallelly for each of the at least one another metagraph transformation, on the at least one device; and
generating at least one another multigraph for depicting the at least one another perspective of the knowledge graph, based on corresponding another transformed property graph generated from the execution of each of the at least one another metagraph transformation on the corresponding transformed property graph.

In this regard, the term "another perspective" refers to a specific view or subset of the knowledge graph whose at least one perspective has already been generated, which highlights certain aspects, entities or relationships relevant to a particular context or query. It will be appreciated that the "at least one another perspective" refers to "single another perspective" in some implementations, and "a plurality of another perspectives" in other implementations. Throughout the present disclosure, the term "another metagraph transformation" refers to using a higher-level abstraction to perform a complex transformation on the data of the corresponding transformed property graph that has already been transformed using the at least one metagraph transformation without directly modifying the corresponding transformed property graph. It will be appreciated that the "at least one another metagraph transformation" refers to "single another metagraph transformation" in some implementations, and "a plurality of another metagraph transformations" in other implementations. Throughout the present disclosure, the term "another multigraph" refers to that graph having no graph cycles, such that the data is represented as a tree structure for depicting the at least one another perspective of the knowledge graph whose at least one perspective has already been generated. It will be appreciated that the "at least one another multigraph" refers to "single another multigraph" in some implementations, and "a plurality of another multigraphs" in other implementations. Optionally, the at least one another multigraph is at least one another directed multigraph. Moreover, a number of the at least one another multigraph is equal to a number of the at least one another metagraph transformation. A technical effect is that new perspectives (i.e., the at least one another perspective) of the knowledge graph are effectively generated over existing perspectives (i.e., the at least one perspective).

Throughout the present disclosure, the term "processor" refers to refers to a computational element, for example an array of data processors, that is operable to execute instructions of the system. It will be appreciated that the term "at least one processor" refers to "one processor" in some implementations, and "a plurality of processors" in other implementations. Examples of the at least one processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the at least one processor may refer to one or more individual servers, processing devices and various elements associated with a processing device that may be shared by other processing devices. Additionally, one or more individual processors, processing devices and elements are arranged in various architectures for responding to and processing the instructions that execute the instructions of the optical apparatus. Optionally, the at least one processor is coupled to the database in a wired or wireless manner.

Optionally, the plurality of vertices and edges in the knowledge graph, and the set of vertices and edges in the property graph of the knowledge graph are represented as a list of adjacency matrices, and wherein the list of adjacency matrices is indexed by a triplet of a source, a relationship, and a destination vertex or edge type.

Optionally, a number of the plurality of vertices in the knowledge graph is at least 1 billion vertices.

Optionally, the plurality of matrix-linear algebra operations comprises at least one of: a multipartite projection, an edge aggregation, a multipartite quotient, a vertex and edge type removal.

Optionally, the multipartite quotient comprises a series of the multipartite projections.

Optionally, the at least one processor is configured to parallelly execute the plurality of matrix-linear algebra operations for each of the at least one metagraph transformation, on the at least one device, using a spark processing arrangement.

Optionally, the at least one processor is configured to execute each of the plurality of matrix-linear algebra operations for each of the at least one metagraph transformation using a Graph BLAS library for performing matrix calculations associated with each of the plurality of matrix-linear algebra operations.

Optionally, the at least one processor is further configured to store a result of the execution of each of the at least one metagraph transformation on the property graph in a data repository communicably coupled to the at least one processor.

Optionally, the at least one processor is further configured to:
de-select one or more vertices amongst the set of vertices and one or more edges amongst the set of edges in the property graph that remain unchanged in the corresponding transformed property graph and depict the one or more vertices and the one or more edges to be faded out in the at least one multigraph; and
add new edges to the corresponding transformed property graph represented in form of dashed lines.

Optionally, the at least one processor is further configured to:
create at least one another metagraph transformation to be executed on the corresponding transformed property graph generated from the execution of the at least one metagraph transformation on the property graph, to generate at least one another perspective of the knowledge graph, wherein each of the at least one another metagraph transformation is lazily evaluated on the corresponding transformed property graph;
adjust the at least one another metagraph transformation based on the lazy evaluation of the at least one another metagraph transformation on the corresponding transformed property graph;
execute the at least one another metagraph transformation on the corresponding transformed property graph, based on the execution of the plurality of matrix-linear algebra operations parallelly for each of the at least one another metagraph transformation, on the at least one device; and
generate at least one another multigraph to depict the at least one another perspective of the knowledge graph, based on corresponding another transformed property graph generated from the execution of each of the at least one another metagraph transformation on the corresponding transformed property graph.

DETAILED DESCRIPTION OF THE DRAWINGS

Referring to FIG. 1, there is provided an illustration of a flowchart depicting steps of a method for generating at least one perspective of a knowledge graph, according to an embodiment of the present disclosure. At a step 102, the knowledge graph is received from a database, wherein the knowledge graph comprises a plurality of vertices at least partially connected together by a plurality of edges. At a step 104, a property graph of the knowledge graph is generated, wherein the property graph comprises a set of vertices at least partially connected together by a set of edges. At a step 106, at least one metagraph transformation is created to be executed on the property graph for generating the at least one perspective of the knowledge graph, wherein each of the at least one metagraph transformation is lazily evaluated on the property graph. At a step 108, the at least one metagraph transformation is adjusted based on the lazy evaluation of the at least one metagraph transformation on the property graph. At a step 110, the at least one metagraph transformation on the property graph is executed, based on in-parallel execution of a plurality of matrix-linear algebra operations for each of the at least one metagraph transformation, on at least one device. At a step 112, at least one multigraph is generated for depicting the at least one perspective of the knowledge graph based on corresponding transformed property graph generated from the execution of each of the at least one metagraph transformation on the property graph.

The aforementioned steps are only illustrative and other alternatives can also be provided where one or more steps are added, one or more steps are removed, or one or more steps are provided in a different sequence without departing from the scope of the claims herein.

Figure 2:
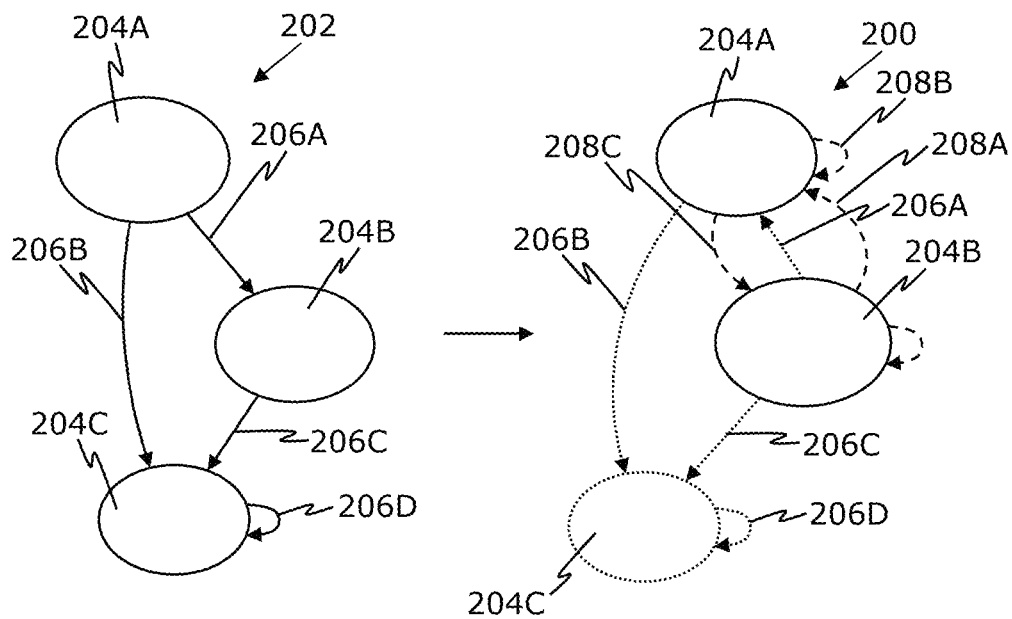
FIG. 2 is a schematic illustration of a corresponding transformed property graph generated from execution of a metagraph transformation on a property graph, according to an embodiment of the present disclosure.

Referring to FIG. 2, there is shown a schematic illustration of a corresponding transformed property graph 200 generated from execution of a metagraph transformation on a property graph 202, according to an embodiment of the present disclosure. As shown, the property graph 202 comprises a set of vertices (depicted as a first vertex 204A, a second vertex 204B, and a third vertex 204C) at least partially connected together by a set of edges (depicted as a first edge 206A, a second edge 206B, a third edge 206C, and a fourth edge 206D). Subsequently, in the corresponding transformed property graph 200, one or more vertex (depicted as the third vertex 204C) from amongst the set of edges 204A-C and one or more edges (depicted as the first edge 206A, the second edge 206B, the third edge 206C, and the fourth edge 206D) from amongst the set of edges 206A-D are depicted to be faded (depicted as dotted). Similarly, new edges (depicted as edges 208A, 208B, and 208C) are added to the corresponding transformed property graph 200 in form of dashed lines.

Figure 3:
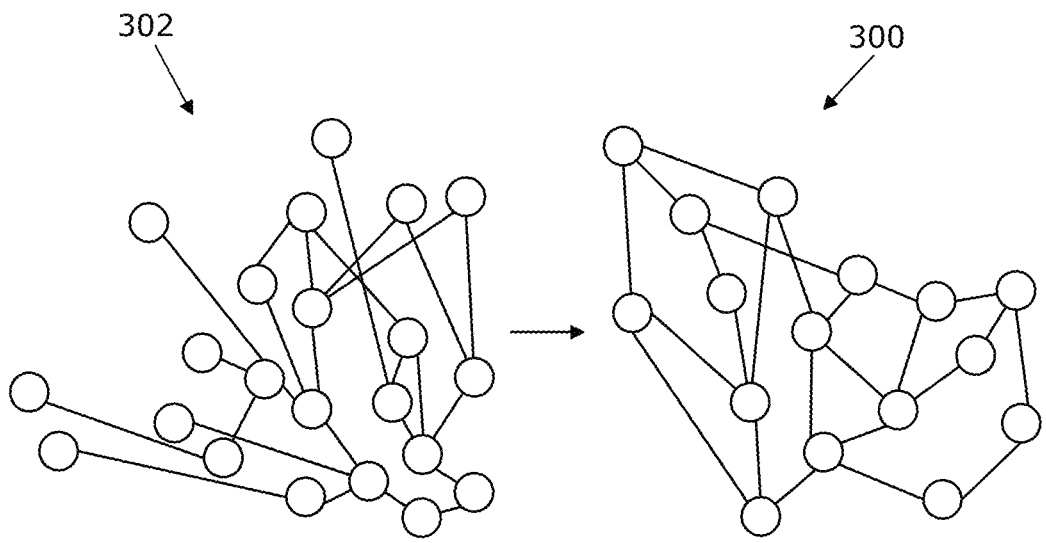
FIG. 3 is a schematic illustration of at least one perspective of a knowledge graph, according to an embodiment of the present disclosure.

Referring to FIG. 3, there is shown a schematic illustration of at least one perspective 300 of a knowledge graph 302, according to an embodiment of the present disclosure. As shown, the at least one perspective 300 of the knowledge graph 302 are generated from the knowledge graph 302.

Figure 4:
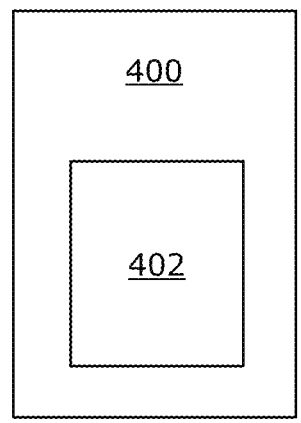
FIG. 4 is a block diagram of a system for generating at least one perspective of a knowledge graph, according to an embodiment of the present disclosure.

Referring next to FIG. 4, there is shown a block diagram of a system 400 for generating at least one perspective of a knowledge graph, according to an embodiment of the present disclosure. As shown, the system 400 comprises at least one processor 402 that is configured to receive the knowledge graph from a database communicably coupled to the at least one processor 402, wherein the knowledge graph comprises a plurality of vertices at least partially connected together by a plurality of edges. Moreover, the at least one processor 402 is configured to generate a property graph of the knowledge graph, wherein the property graph comprises a set of vertices connected by a set of edges. Furthermore, the at least one processor 402 is configured to create at least one metagraph transformation to be executed on the property graph of the knowledge graph to generate the at least one perspective of the knowledge graph, wherein each of the at least one metagraph transformation is lazily evaluated on the property graph. Furthermore, the at least one processor 402 is to adjust the at least one metagraph transformation based on the lazy evaluation of the at least one metagraph transformation on the property graph. Furthermore, the at least one processor 402 is configured to execute the at least one metagraph transformation on the property graph, based on execution of a plurality of matrix-linear algebra operations in parallel (for example, temporally concurrently) for each of the at least one metagraph transformation, on at least one device communicably coupled to the at least one processor. Furthermore, the at least one processor 402 is configured to generate at least one multigraph to depict the at least one perspective of the knowledge graph based on corresponding transformed property graph generated from the execution of each of the at least one metagraph transformation on the property graph.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for generating at least one perspective of a knowledge graph, the method comprising:
receiving the knowledge graph from a database, wherein the knowledge graph comprises a plurality of vertices at least partially connected together by a plurality of edges, wherein the knowledge graph is a structured representation of knowledge to model relationships between entities related to which information is depicted in the knowledge graph, wherein the plurality of vertices are nodes in the knowledge graph to represent the entities within the knowledge graph, and wherein the plurality of edges represent the relationship between the entities within the knowledge graph;
generating, by a processor coupled to the database, a property graph of the knowledge graph, wherein the property graph comprises a set of vertices at least partially connected together by a set of edges, wherein the property graph is generated by transforming data representation in the knowledge graph from one format to another format while preserving semantic information and relationships between the plurality of vertices in the knowledge graph;
creating, by the processor, at least one metagraph transformation to be executed on the property graph for generating the at least one perspective of the knowledge graph, wherein each of the at least one metagraph transformation is lazily evaluated on the property graph by visualizing each of the at least one metagraph transformation for evaluation without executing respective metagraph transformation;
adjusting, by the processor, the at least one metagraph transformation based on the lazy evaluation of the at least one metagraph transformation on the property graph for determining required modifications in the at least one metagraph transformation;
executing, by the processor, the at least one metagraph transformation on the property graph, based on execution of a plurality of matrix-linear algebra operations in parallel for each of the at least one metagraph transformation, using a spark processing arrangement on at least one device, wherein the plurality of vertices in the knowledge graph is at least 1 billion vertices; and
generating, by the processor, at least one multigraph for depicting the at least one perspective of the knowledge graph based on corresponding transformed property graph generated from the execution of each of the at least one metagraph transformation on the property graph.

2. The method according to claim 1, wherein the plurality of vertices and edges in the knowledge graph, and the set of vertices and edges in the property graph of the knowledge graph are represented as a list of adjacency matrices, and wherein the list of adjacency matrices is indexed by a triplet of a source, a relationship, and a destination vertex or edge type.

3. The method according to claim 1, wherein the plurality of matrix-linear algebra operations comprises at least one of: a multipartite projection, an edge aggregation, a multipartite quotient, a vertex and edge type removal.

4. The method according to claim 3, wherein the multipartite quotient comprises a series of the multipartite projections.

5. The method according to claim 1, wherein each of the plurality of matrix-linear algebra operations for each of the at least one metagraph transformation is executed using a Graph BLAS library for performing matrix calculations associated with each of the plurality of matrix-linear algebra operations.

6. The method according to claim 1, further comprising storing a result of the execution of each of the at least one metagraph transformation on the property graph in a data repository.

7. The method according to claim 1, further comprising:
de-selecting one or more vertices amongst the set of vertices and one or more edges amongst the set of edges in the property graph that remain unchanged in the corresponding transformed property graph and depicting the one or more vertices and the one or more edges to be faded out in the at least one multigraph; and
adding new edges to the corresponding transformed property graph represented in form of dashed lines.

8. The method according to claim 1, further comprising:
creating at least one other metagraph transformation to be executed on the corresponding transformed property graph generated from the execution of the at least one metagraph transformation on the property graph, for generating at least one other perspective of the knowledge graph, wherein each of the at least one other metagraph transformation is lazily evaluated on the corresponding transformed property graph;
adjusting the at least one other metagraph transformation based on the lazy evaluation of the at least one other metagraph transformation on the corresponding transformed property graph;
executing the at least one other metagraph transformation on the corresponding transformed property graph, based on the execution of the plurality of matrix-linear algebra operations in parallel for each of the at least one other metagraph transformation, using the spark processing arrangement on the at least one device; and
generating at least one other multigraph for depicting the at least one other perspective of the knowledge graph, based on corresponding other transformed property graph generated from the execution of each of the at least one other metagraph transformation on the corresponding transformed property graph.

9. A system for generating at least one perspective of a knowledge graph, the system comprising:
at least one processor configured to:
receive the knowledge graph from a database communicably coupled to the at least one processor, wherein the knowledge graph comprises a plurality of vertices at least partially connected together by a plurality of edges, wherein the knowledge graph is a structured representation of knowledge to model relationships between entities related to which information is depicted in the knowledge graph, wherein the plurality of vertices are nodes in the knowledge graph to represent the entities within the knowledge graph, and wherein the plurality of edges represent the relationship between the entities within the knowledge graph;
generate, by the processor coupled to the database, a property graph of the knowledge graph, wherein the property graph comprises a set of vertices connected by a set of edges, wherein the property graph is generated by transforming data representation in the knowledge graph from one format to another format while preserving semantic information and relationships between the plurality of vertices in the knowledge graph;
create at least one metagraph transformation to be executed on the property graph of the knowledge graph to generate the at least one perspective of the knowledge graph, wherein each of the at least one metagraph transformation is lazily evaluated on the property graph by visualizing each of the at least one metagraph transformation for evaluation without executing respective metagraph transformation;
adjust the at least one metagraph transformation based on the lazy evaluation of the at least one metagraph transformation on the property graph for determining required modifications in the at least one metagraph transformation;
execute the at least one metagraph transformation on the property graph, based on execution of a plurality of matrix-linear algebra operations in parallel for each of the at least one metagraph transformation, using a spark processing arrangement on at least one device communicably coupled to the at least one processor, wherein the plurality of vertices in the knowledge graph is at least 1 billion vertices; and
generate at least one multigraph to depict the at least one perspective of the knowledge graph based on corresponding transformed property graph generated from the execution of each of the at least one metagraph transformation on the property graph.

10. The system according to claim 9, wherein the plurality of vertices and edges in the knowledge graph, and the set of vertices and edges in the property graph of the knowledge graph are represented as a list of adjacency matrices, and wherein the list of adjacency matrices is indexed by a triplet of a source, a relationship, and a destination vertex or edge type.

11. The system according to claim 9, wherein the plurality of matrix-linear algebra operations comprises at least one of: a multipartite projection, an edge aggregation, a multipartite quotient, a vertex and edge type removal.

12. The system according to claim 11, wherein the multipartite quotient comprises a series of the multipartite projections.

13. The system according to claim 9, wherein the at least one processor is configured to execute each of the plurality of matrix-linear algebra operations for each of the at least one metagraph transformation using a Graph BLAS library for performing matrix calculations associated with each of the plurality of matrix-linear algebra operations.

14. The system according to claim 9, wherein the at least one processor is further configured to store a result of the execution of each of the at least one metagraph transformation on the property graph in a data repository communicably coupled to the at least one processor.

15. The system according to claim 9, wherein the at least one processor is further configured to:
de-select one or more vertices amongst the set of vertices and one or more edges amongst the set of edges in the property graph that remain unchanged in the corresponding transformed property graph and depict the one or more vertices and the one or more edges to be faded out in the at least one multigraph; and add new edges to the corresponding transformed property graph represented in form of dashed lines.

16. The system according to claim 9, wherein the at least one processor is further configured to:

create at least one other metagraph transformation to be executed on the corresponding transformed property graph generated from the execution of the at least one metagraph transformation on the property graph, to generate at least one other perspective of the knowledge graph, wherein each of the at least one other metagraph transformation is lazily evaluated on the corresponding transformed property graph;

adjust the at least one other metagraph transformation based on the lazy evaluation of the at least one other metagraph transformation on the corresponding transformed property graph;

execute the at least one other metagraph transformation on the corresponding transformed property graph, based on the execution of the plurality of matrix-linear algebra operations in parallel for each of the at least one other metagraph transformation, using the spark processing arrangement on the at least one device; and generate at least one other multigraph to depict the at least one other perspective of the knowledge graph, based on corresponding other transformed property graph generated from the execution of each of the at least one other metagraph transformation on the corresponding transformed property graph.

* * * * *